FLUID AMPLIFIER CONTROL
Filed Nov. 18, 1966
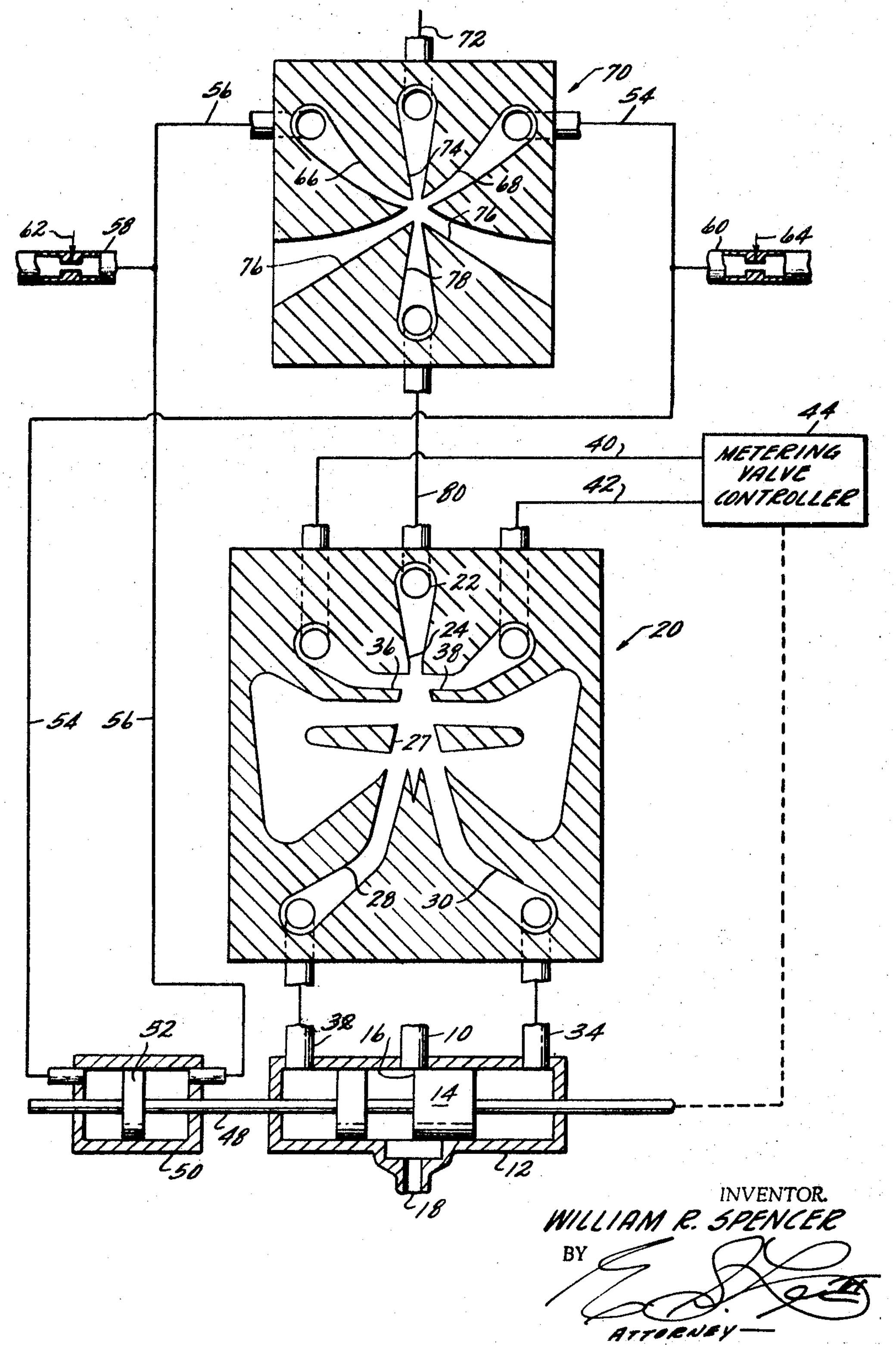
INVENTOR.
WILLIAM R. SPENCER
BY
ATTORNEY United States Patent Office 3,461,777

Patented Aug. 19, 1969

3,461,777

FLUID AMPLIFIER CONTROL

William R. Spencer, Cincinnati, Ohio, assignor to General Electric Company, a corporation of New York Filed Nov. 18, 1966, Ser. No. 595,378
Int. Cl. F15b 13/02
U.S. Cl. 91—3 6 Claims

ABSTRACT OF THE DISCLOSURE

A fluid amplifier control is disclosed wherein a signal whose level is related to that of the amplifier receiver pressure is fed back to vary, through suitable means, the inlet pressure to the amplifier power nozzle, thereby providing a means for limiting the amplifier recovered pressure at maximum deflection of the power stream without limiting the recovered pressure for small deflections of the power stream.

The present invention relates to fluid amplifier control and more specifically to an improved control.

The use of fluid amplifiers in control applications is well known in the art. A typical amplifier for this purpose comprises a pair of receivers positioned downstream of a nozzle through which a fluid power stream is discharged. A pressure differential is created on opposite sides of the power stream by differential fluid pressure signals from a pair of control ports to deflect the power stream and vary the pressure of fluid recovered in the receivers. Thus, the differential fluid pressure control signals are amplified to produce a much higher output.

This pressure output from the amplifier may be used for numerous control applications, including the positioning of a piston displaceable in a chamber. When the receivers are connected to opposite ends of the chamber, the differential output pressure signals are applied to the piston which urges it into motion with a velocity proportional to the recovered pressure differential.

In certain control applications, it is desirable to limit the velocity of the piston and hence the recovered pressure for which a number of velocity limiting devices have been proposed. One approach is to provide restricting orifices in the receiver passageways to limit the flow to the chamber, and hence the velocity of the piston. Another approach is to provide a bleed passageway in the piston to reduce the effective pressure differential thereacross. Still another approach is to employ a negative rate feedback device which reduces the pressure differential between the control ports as the piston velocity increases.

While effective in some instances, the above schemes have limited usefulness when precise velocity limiting is desired. One of the problems is that while the velocity in each case may be limited, the gain of the amplifier or the output and input presure ratio varys as a function of the input presure ratio. In other words, the pressure gain of the amplifier is reduced for relatively low differential pressure control signals; thus impairing the response of the control to small input signals.

Accordingly, it is an object of the present invention to limit the pressure output of a fluid amplifier while providing a relatively high pressure gain output for low control input signals.

The above ends are achieved by providing a fluid amplifier control comprising a nozzle through which a fluid power stream is discharged. At least one receiver is positioned downstream of and facing the nozzle. Means are provided for creating a differential fluid presure control signal across the power stream thereby varying its relation to, and the recovered fluid pressure in the receiver. Means responsive to the recovered fluid presure of the power stream are provided for varying the pressure of the power stream to achieve a relatively high recovered pressure in the receiver passageway for relatively low differential fluid pressure control signals.

Preferably, the pressure responsive means reduces the pressure of the power stream thereby causing it to further vary its relation to the receiver and maintain the recovered fluid pressure in the receiver. The fluid amplifier further comprises means for maintaining the relation of the power stream to the receiver such that the receiver fully recovers the pressure of the power stream whereby the recovered pressure in the receiver is limited to a given maximum irrespective of the control signal differential pressure.

The above and other related objects and features of the present invention will be apparent from a reading of the following description of the disclosure found in the accompanying drawing and the novelty thereof pointed out in the appended claims.

The drawing illustrates a fluid amplifier system embodying the present invention.

The drawing illustrates a fluid flow control system in which the present invention may be used. The flow control system comprises a conduit 10 for delivery of a suitable supply of fluid to a cylinder 12 in which a metering valve 14 is displaceable. A spool 16 on the metering valve 14 cooperates with the conduit 10 to form a variable area orifice for passage of fluid into the cylinder 12 and to a discharge conduit 18. The metering valve 14 is positioned by a fluidic power amplifier 20 comprising an inlet 22 for pressurized fluid which is discharged through nozzle 24 in the form of a power stream toward a pair of receivers 28 and 30. The receivers 28 and 30 are connected to opposite ends of the cylinder 12 by conduits 32, 34 respectively. A pair of control ports 36 and 38 are positioned to discharge control fluid normal to the flow path of the fluid power stream from the nozzle 24. The ports 36, 38 are connected by conduits 40, 42, respectively to a metering valve controller 44 which transmits differential pressure control signals thereto. Thus, a pressure differential is created on opposite sides of the fluid power jet to cause it to deflect towards one of the receiver passageways 28 or 30 proportionate to the ratio between the differential pressure of the control port 36, 38 and the pressure of the fluid power jet. The deflection of the fluid power jet towards one of the receivers 28 or 30 causes differential pressure across the metering valve 14. The metering valve 14 is then urged into motion with a velocity proportionate to the differential pressure recovered by the receivers.

The fluid flow control system described may be advantageously used to supply fuel to a gas turbine engine. For this purpose, the metering valve controller 44 is adapted to deliver pressure signals to the control ports 36, 38 which cause the metering valve to be displaced towards an opening position which gives a predetermined fuel flow as a function of operator demand and other engine parameters. A mechanical position feedback signal is provided from the metering valve 14 to the metering valve controller 44 in order that the differential pressure signals to the control ports 36, 38 be nulled out when the metering valve 14 attains the position which achieves the desired fuel flow.

In the operation of a gas turbine engine, there are instances where a rapid increase of fuel is required, e.g., when the engine is accelerated from idle to full power at an emergency rate. During this condition, it is desirable to limit the maximum rate of increase of fuel flow to the engine to avoid compressor stall and adverse component temperature increases. To achieve this end, the maximum velocity of the metering valve 14 is limited by the means now to be described.

A control piston rod 48 extends from the metering valve 10 through a control cylinder 50. A control piston 52, secured to the rod 48, is reciprocable in the cylinder 50. A pair of conduits 54, 56 extend from opposite ends of the cylinder 50 and are connected to a common or a return pressure source by conduits 58 and 60 which have orifices 62 and 64 therein. The conduits 54, 56 are also connected to control ports 66, 68, respectively of a fluidic rectifier 70. The fluidic rectifier 70 has an inlet 72 for a source of pressurized fluid which is normally discharged in the form of a power stream from a nozzle 74 into a receiver 78 which is connected, via conduit 80, to the inlet 22 of the fluidic power amplifier 20. Venting passageways 76 connected to the return pressure source are provided between the control ports 66, 68 and the receiver 78.

When the metering valve 14 is displaced to the right, or an open position, by deflection of the fluidic power jet to the left, the control piston 52 is also displaced in the cylinder 50. As a result, the control piston 52 discharges fluid from the cylinder 50 through conduit 56 causing an increase in pressure in the control port 66 and a decrease in pressure in port 68 as a function of control piston velocity. This differential pressure between the control ports 66, 68, cause the fluidic rectifier power stream to deflect away from the receiver 78, thus lowering the pressure of the fluidic amplifier power stream proportionate to the velocity of the metering valve 14. However, since the deflection of the fluidic amplifier power stream is dependent upon the ratio between its pressure and the differential pressure of the control ports 36, 38, the reduced pressure fluidic amplifier power stream is deflected further so that a greater percentage of the stream is recovered by the passageway 28, and the initial pressure therein is maintained. The amplifier power stream continues to deflect with further reduction in supply pressure until it is completely recovered by the receiver passageway 28. Any further deflection beyond the receiver passageway 28 is prevented by blocker element 27 positioned to redeflect the power stream into the receiver passageway. After the fluid power stream is deflected to be fully recovered by the receiver passageway 28, further reductions in the fluidic amplifier supply pressure reduces the pressure applied to the metering valve 14 and thus its velocity.

It is apparent from the foregoing that when a pressure differential is initiated between the fluidic amplifier control ports 36, 38, a relatively large pressure differential is applied to the ends of the metering valve 14 to overcome its inertia and functional forces to quickly accelerate it to a predetermined velocity at which point the fluidic amplifier power stream pressure is reduced to maintain that velocity.

It can be seen that the limiting velocity of the meterin valve 14 is determined by the pressure response of the fluidic rectifier control ports 66, 68, and hence the fluidic rectifier pressure output to the velocity of the control piston 52. To enable selection of the limiting velocity, the orifices 64 and 66 may be varied to increase the total area through which the flow from the control cylinder 50 passes and in turn vary its pressure response to that flow.

An alternative to the control of the power stream pressure by the differential pressure in the control cylinder 50 is to use the differential pressure in the receivers 28 and 30. While this approach provides an indirect sensing of the metering valve velocity, it enables a much broader use of the fluid amplifier 20. In this instance, the gain of the fluid amplifier is maintained at low input control signals and limited to a predetermined level.

The invention thus described provides a highly effective means for limiting the maximum velocity of a metering valve powered by a fluidic amplifier. However, the present invention is not limited to control of a metering valve but may be advantageously used to enhance the pressure gain of a fluidic amplifier and limit the maximum output pressure.

Having thus described the invention, what is claimed as novel and desired to be secured by Letters Patent of the United States is:

1. A fluid amplifier control comprising:
a nozzle through which a fluid power stream is discharged,
at least one receiver downstream of and facing said nozzle,
means for creating a differential fluid pressure control signal across said power stream thereby varying its relation to, and the recovered fluid pressure in said receiver,
means responsive to the recovered fluid pressure in said receiver for varying the supply pressure of said power stream to provide a relatively high recovered pressure in said receiver passageway for relatively low differential fluid pressure control signals.

2. A fluid amplifier control as in claim 1 wherein:
said pressure responsive means reduces the supply pressure of said power stream thereby causing it to further vary its relation to said receiver and maintain the recovered fluid presure in said receiver,
said fluid amplifier control further comprises means for maintaining the relation of said power stream to said receiver such that said receiver fully recovers the pressure of said power stream,
whereby the recovered pressure in said receiver is limited to a given maximum irrespective of the magnitude of the control signal pressure differential.

3. A fluid amplifier control as in claim 2 wherein said pressure varying means comprises:
a nozzle through which a fluid power stream is discharged,
a receiver downstream of and facing said nozzle for receiving the normal flow of said power stream,
passageway means for providing a flow path between the receiver of said presure varying means and said first mentioned nozzle,
means responsive to the recovered fluid pressure in said first mentioned receiver for creating a pressure differential across the power stream of said pressure varying means thereby deflecting said power stream away from said receiver and lowering the supply pressure of the first mentioned power stream.

4. A fluid amplifier control as in claim 3 in combination with:
a chamber,
a piston displaceable therein,
conduit means for providing a flow path from said first mentioned receiver to one end of said chamber,
whereby the piston is displaced at a rate dependent upon the recovered fluid pressure in said first mentioned conduit means and the velocity of said piston is limited to a given maximum value irrespective of the magnitude of the control signal pressure differential.

5. Apparatus as in claim 4 wherein:
said piston is reciprocable in said chamber,
a pair of first mentioned receivers are provided,
the pressure differential controlling means for the power stream of said pressure varying means comprises:
a control chamber in which fluid is maintained,
a control piston reciprocable in said chamber,
means for connecting said control piston to said piston,
a pair of ports positioned on opposite sides of said pressure varying power stream,
passageway means respectively extending from opposite ends of said control cylinder to said ports whereby a pressure differential proportionate to the velocity of said piston is created on opposite sides of said pressure varying power stream.

6. Apparatus as in claim 5 wherein said pressure differential controlling means for the pressure varying power stream further comprises:

passageway means extending from said control chamber passageway means to a low pressure discharge point and variable area orifice means disposed therein, whereby the area of said orifice means may be selected to vary the pressure response in said control cylinder passageway means to the velocity of said piston and vary the maximum velocity thereof.

References Cited

UNITED STATES PATENTS

| | | | |
|---|---|---|---|
| 3,122,062 | 1/1962 | Spivak et al. | 91—3 |
| 3,158,166 | 8/1962 | Warren | 137—81.5 |
| 3,124,999 | 3/1964 | Woodward | 137—81.5 XR |
| 3,181,546 | 5/1965 | Boothe | 137—81.5 |
| 3,185,166 | 5/1965 | Horton et al. | 137—81.5 |
| 3,208,448 | 9/1965 | Woodward | 137—81.5 XR |
| 3,220,428 | 11/1965 | Wilkerson | 137—81.5 |
| 3,223,101 | 12/1965 | Bowles | 137—81.5 |
| 3,228,410 | 1/1966 | Warren et al. | 137—81.5 |
| 3,233,622 | 2/1966 | Boothe | 137—81.5 |
| 3,267,947 | 8/1966 | Bowles | 137—81.5 |

SAMUEL SCOTT, Primary Examiner

U.S. Cl. X.R.

91—388; 137—81.5